(12) United States Patent
Waisbard et al.

(10) Patent No.: US 8,677,462 B2
(45) Date of Patent: Mar. 18, 2014

(54) EFFICIENT AND SECURE RENEWAL OF ENTITLEMENTS

(75) Inventors: Erez Waisbard, Or-Yehuda (IL); Yaron Sella, Yehud (IL)

(73) Assignee: Cisco Technology Inc., San Jose, CA (US)

( * ) Notice: Subject to any disclaimer, the term of this patent is extended or adjusted under 35 U.S.C. 154(b) by 1358 days.

(21) Appl. No.: 11/665,791

(22) PCT Filed: Nov. 1, 2004

(86) PCT No.: PCT/IL2004/000998
§ 371 (c)(1),
(2), (4) Date: Jun. 27, 2007

(87) PCT Pub. No.: WO2006/048856
PCT Pub. Date: May 11, 2006

(65) Prior Publication Data
US 2008/0120708 A1    May 22, 2008

(51) Int. Cl.
*H04L 29/06* (2006.01)

(52) U.S. Cl.
USPC .............................................. 726/6; 713/155

(58) Field of Classification Search
USPC .......... 380/210, 227, 291, 293, 241; 726/6–9, 726/30; 713/160–171
See application file for complete search history.

(56) References Cited

U.S. PATENT DOCUMENTS

| | | | | |
|---|---|---|---|---|
| 5,461,675 A | | 10/1995 | Diehl et al. | |
| 5,758,068 A | * | 5/1998 | Brandt et al. | 726/27 |
| 6,031,467 A | * | 2/2000 | Hymel et al. | 340/7.49 |
| 6,105,134 A | * | 8/2000 | Pinder et al. | 713/170 |
| 6,115,640 A | * | 9/2000 | Tarumi | 700/99 |
| 6,151,262 A | * | 11/2000 | Haroun et al. | 365/227 |
| 6,157,719 A | * | 12/2000 | Wasilewski et al. | 380/210 |
| 7,225,164 B1 | | 5/2007 | Candelore et al. | |
| 2001/0037403 A1 | * | 11/2001 | Mougi et al. | 709/238 |
| 2002/0009078 A1 | * | 1/2002 | Wilson et al. | 370/389 |
| 2002/0120928 A1 | * | 8/2002 | Wajs | 725/25 |
| 2002/0147686 A1 | | 10/2002 | Safadi et al. | |
| 2003/0003983 A1 | * | 1/2003 | Walker et al. | 463/16 |
| 2003/0033601 A1 | * | 2/2003 | Sakata et al. | 725/29 |

(Continued)

FOREIGN PATENT DOCUMENTS

| | | |
|---|---|---|
| EP | 0 866 613 A1 | 9/1998 |
| EP | 1 094 667 A1 | 4/2001 |
| EP | 1 280 350 A1 | 1/2003 |
| WO | WO 03/003740 A1 | 1/2003 |

OTHER PUBLICATIONS

Mar. 27, 2009 Office Communication in connection with EP 04 799 307.6-1241.

(Continued)

*Primary Examiner* — Eleni Shiferaw
*Assistant Examiner* — Phy Anh Vu
(74) *Attorney, Agent, or Firm* — Husch Blackwell LLP

(57) ABSTRACT

A method for granting a grace period entitlement, the method comprising receiving a grace period entitlement message, establishing whether a grace period flag indicates that a grace period may be granted, granting a grace period to an expired entitlement based, at least in part, on the grace period entitlement message, only if the grace period flag is "off", and setting the grace period flag to indicate that the grace period has been granted. Related methods and apparatus are also described.

23 Claims, 7 Drawing Sheets

(56) References Cited

U.S. PATENT DOCUMENTS

| | | |
|---|---|---|
| 2003/0097655 A1 | 5/2003 | Novak |
| 2003/0144946 A1* | 7/2003 | Misawa et al. ............... 705/37 |
| 2003/0191958 A1 | 10/2003 | Gartside et al. |
| 2004/0052377 A1* | 3/2004 | Mattox et al. ............... 380/277 |
| 2004/0215467 A1* | 10/2004 | Coffman et al. ............... 705/1 |
| 2004/0228461 A1* | 11/2004 | Moss et al. ............... 379/114.17 |
| 2005/0044191 A1* | 2/2005 | Kamada et al. ............... 709/223 |
| 2005/0138406 A1* | 6/2005 | Cox ............... 713/200 |
| 2007/0230700 A1* | 10/2007 | Dekker et al. ............... 380/241 |

OTHER PUBLICATIONS

Sep. 2008 Supplementary EPO search report in connection with counterpart foreign application.

Feb. 14, 2010 office communication in connection with prosecution of IL 182654 (English translation) (2 pages).

Mar. 2011 Office Communication in connection with prosecution of EP 04799 307.6.

* cited by examiner

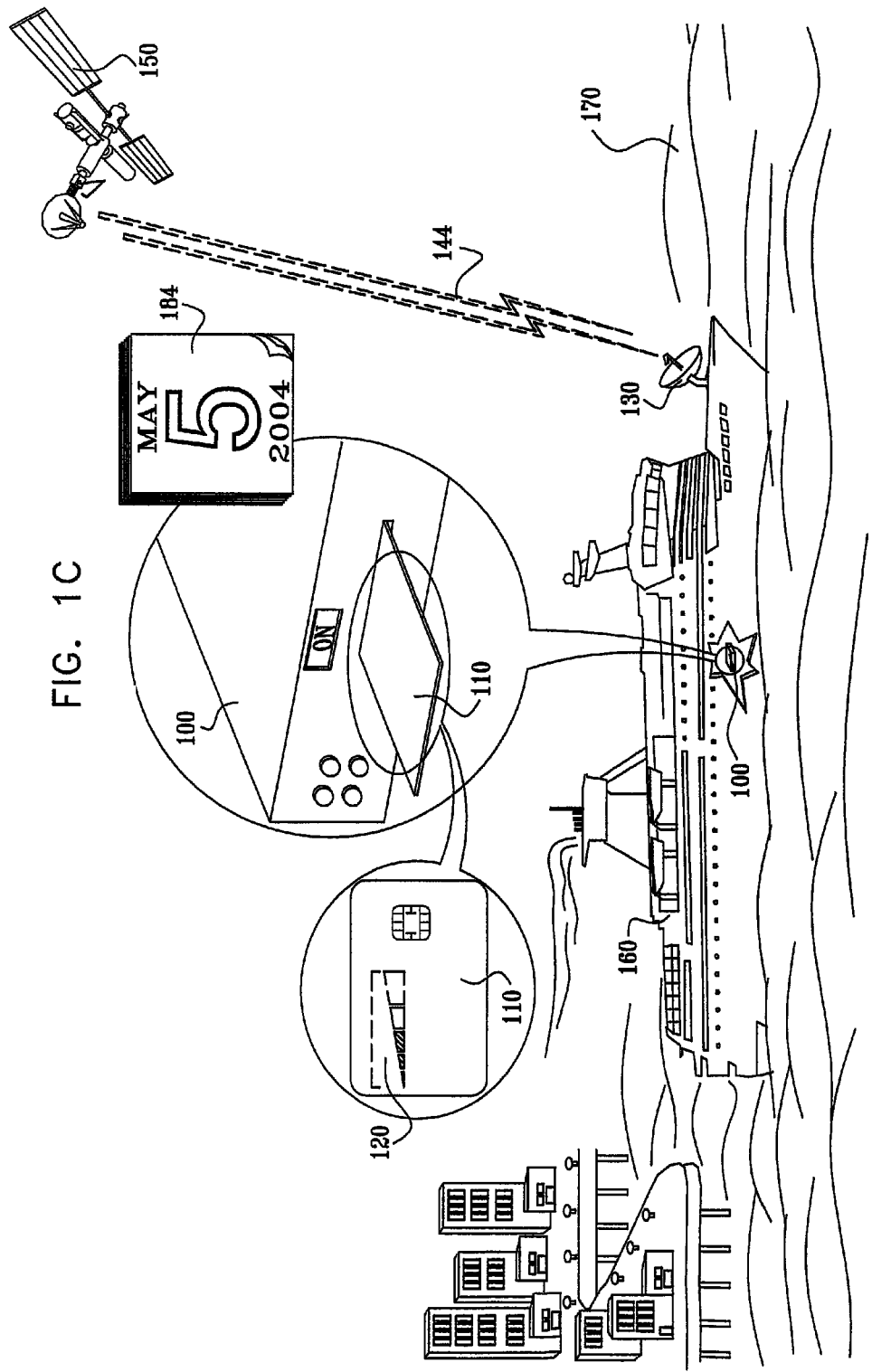

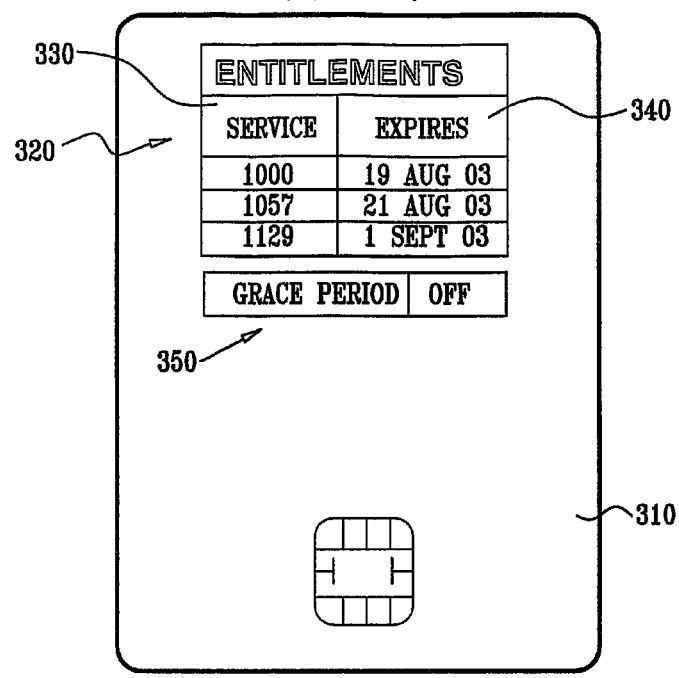
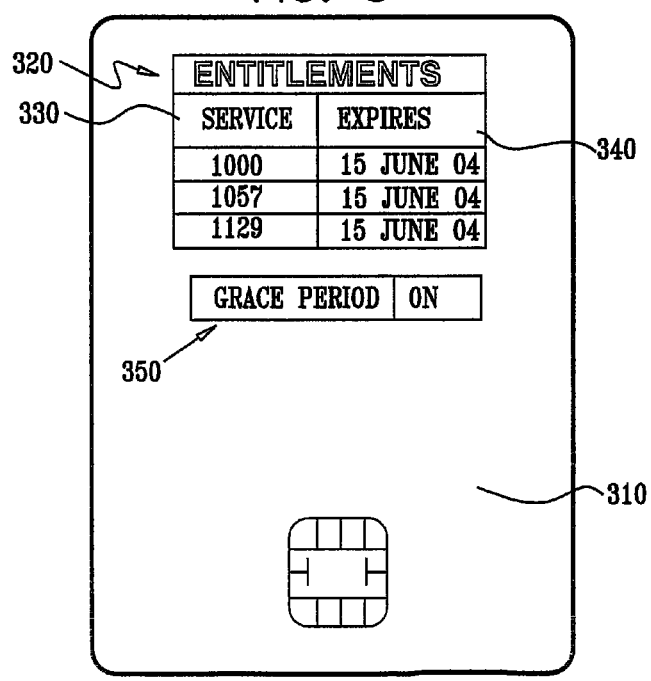

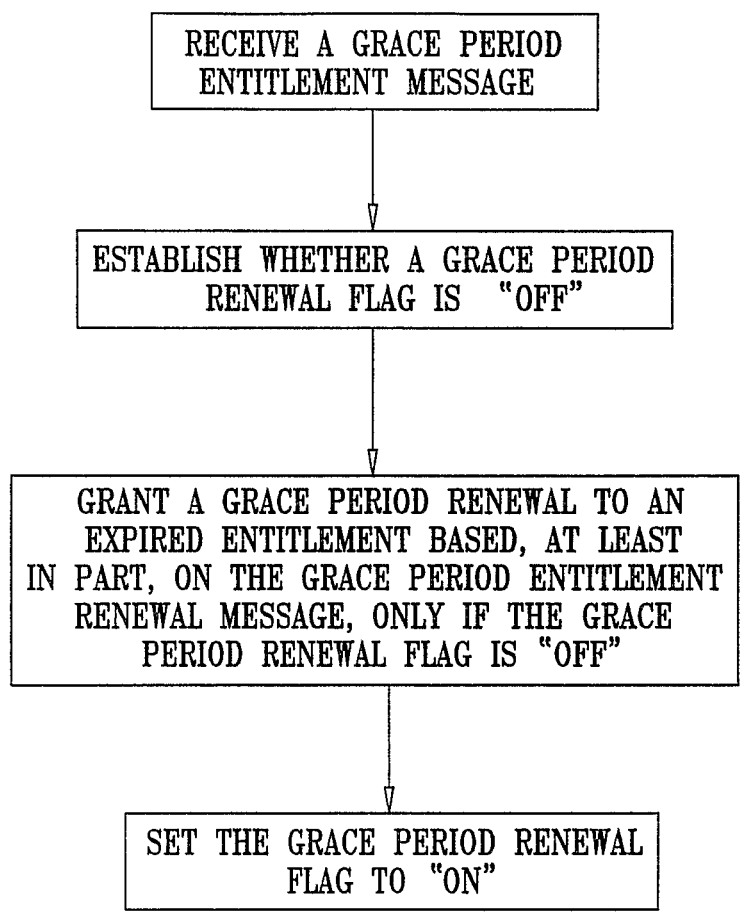

EFFICIENT AND SECURE RENEWAL OF ENTITLEMENTS

FIELD OF THE INVENTION

The present invention relates to conditional access systems, and more particularly to entitlement management.

BACKGROUND OF THE INVENTION

In pay television, and more generally, in many pay for content systems, content is frequently encrypted. Decryption keys are made available only to paying customers. Content is typically accompanied by an access structure specifying usage rules for the content, and entitlements to content. Access structures which specify usage rules are often referred to as entitlement control messages, or ECMs. Typically, entitlements are delivered as entitlement management messages, or EMMs.

Conditional access systems typically rely on a secure module which processes incoming content according to the ECMs and the EMMs received. Based on the information in the received ECMs and EMMs, the secure module either allows decrypting the content or not. When content is available on a pay for content basis, such as in a pay TV system, the secure module typically comprises secrets, such as entitlements. A user with an appropriate entitlement is entitled to view content. A user without the appropriate entitlement is not allowed to view content. Using entitlements enables a conditional access system to differentiate between a paying subscriber and a person intercepting signals in order to receive content and watch the content for free.

Typically, the secure module is designed to be as tamper-proof as is possible. Frequently, the secure module is implemented in a smart card. Alternatively, the secure module is implemented in a secure processor comprised in a set top box. Without loss of generality, the term "smart card" or "smart cards" is used throughout the present specification to refer to the secure module.

As watching a particular unit of content requires having the appropriate entitlement to the particular unit of content watched, if a subscriber terminates his subscription, the subscriber's entitlement is revoked. Unscrupulous persons, known as "pirates" or "hackers", who wish to watch content for free, often try to block the arrival of messages that entail cancellation of services. One common line of defense against such hackers is for entitlements to expire. Typically, the entitlement expires after one month. Since the entitlement expires, a hacker who has prevented a message canceling the entitlement from arriving at the smart card will nevertheless lose the entitlement after the entitlement expiration date.

On the other hand, legitimate subscribers periodically receive entitlement renewal messages. Entitlement renewal messages renew the entitlement for another month. Entitlement renewal messages are typically sent to subscribers at a low rate, due to bandwidth considerations.

As a consequence of the low refresh rate of entitlement renewal messages, if the set top box is turned off in such a way as to prevent reception of messages for an extended period of time, an existing entitlement expires, and regular renewal messages will not be received. The subscriber may then have to wait, typically for several hours, for an entitlement renewal message to arrive. Alternatively, the subscriber may have to call a service center and ask for an entitlement renewal message to be sent immediately. Either of these two scenarios is liable to cause the subscriber to feel that he has received poor service from the broadcaster. Furthermore, the broadcaster pays for such calls, and therefore, it is desirable to keep the number of such calls to a minimum.

U.S. Pat. Nos. 5,282,249 and 5,481,609 to Cohen et al describe a system for controlling access to broadcast transmissions including a transmitter having a transmission encoder for scrambling the broadcast, a multiplicity of subscriber receivers, each having an identical receiving decoder, containing no cryptographic keys, for descrambling the broadcast and a plurality of selectable and portable executing apparatus each being operatively associatable with a receiving decoder at a partially different given time and each executing generally identical operations to generate a seed for use by the associated receiving decoder to enable the receiving decoder to descramble the broadcast.

U.S. Pat. No. 6,178,242 of Tsuria describes a system for producing an output scrambled digital data stream from an input scrambled digital data stream. The input scrambled digital data stream includes a plurality of control messages (ECMs), each ECM including coded information for generating a control word (CW) associated with the ECM and being encoded using an ECM key. The input scrambled digital data stream also includes a plurality of segments of scrambled digital data, each segment of scrambled digital data being associated with one of the plurality of ECMs and being scrambled using the CW associated with the ECM. A method for producing the output scrambled digital data stream includes replacing each of the plurality of ECMs with a corresponding transformed ECM (TECM), each corresponding TECM comprising coded information for generating the CW associated with the corresponding ECM and being encoded using a TECM key, thus producing the output scrambled digital data stream, wherein the ECM key is replaced with a new ECM key at an ECM key change time, and the TECM key is not replaced at the ECM key change time Published US Patent Application 2004/0168063 of Revital et al. describes a system and a method for secure transmission of protected content to a subscriber, without requiring a smart card or other renewable security element to be in physical proximity of the recipient module of the subscriber, such as a set-top box for example. Therefore, the renewable security element may optionally be protected and controlled by the transmitter of the protected content, such as by the broadcaster for example.

US Patent Application 2002/0147686 of Safadi et al. describes a method and apparatus for distributing multimedia content over a network to a plurality of networked and portable devices affording a system operator the ability to control the unauthorized distribution and playback of content transferred by the system operator to a user of that system. The transferred content in the form of encrypted data is distributed over the network from a set-top terminal/personal versatile recorder to at least one playback device, in accordance with rights established by the system operator or the content provider, where the content is decrypted for subsequent playback by the authorized devices.

US Patent Application 2003/0097655 of Novak describes a system and method for providing conditional access to digital content, whereby, in response to a user request to view specific digital content, the user's set top box (STB) accesses a verification entity via a persistent network connection. The STB establishes the user's identity with the verification entity, for instance, by reading identity credentials from a smart card. In response to the verification entity having stored a license for the user to view the digital content, the STB receives a license key from the verification entity. In addition, the STB receives an encrypted access key from an access key source corresponding to a segment of encrypted digital content. The license key is used to decrypt the encrypted access key, which is, in turn, used to decrypt the segment of encrypted digital content. A user may transfer his or her license in whole or in part to another user by sending a transfer request to the verification entity.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide an improved method and system for providing grace period entitlement messages, thereby alleviating the need for a subscriber to wait a long time for an entitlement renewal message to arrive, or alternatively, to call a service center.

There is thus provided in accordance with a preferred embodiment of the present invention a method for granting a grace period entitlement, the method including receiving a grace period entitlement message, establishing whether a grace period flag indicates that a grace period may be granted, granting a grace period to an expired entitlement based, at least in part, on the grace period entitlement message, only if the grace period flag is "off", and setting the grace period flag to indicate that the grace period has been granted.

Further in accordance with a preferred embodiment of the present invention the flag is uniquely associated with the expired entitlement.

Still further in accordance with a preferred embodiment of the present invention the flag is globally associated with a plurality of expired entitlements.

Additionally in accordance with a preferred embodiment of the present invention the flag consists of one bit.

Moreover in accordance with a preferred embodiment of the present invention the flag includes a counter.

Further in accordance with a preferred embodiment of the present invention no further grace periods are granted to the expired entitlement if the counter exceeds a predetermined threshold.

Still further in accordance with a preferred embodiment of the present invention the flag is "off" when the threshold is not exceeded, and the flag is "on" when the threshold is exceeded.

Additionally in accordance with a preferred embodiment of the present invention each succeeding grace period is granted for a shorter amount of time than a previous grace period.

Moreover in accordance with a preferred embodiment of the present invention the message is sent by a broadcast headend.

Further in accordance with a preferred embodiment of the present invention the message is repeatedly broadcast.

Still further in accordance with a preferred embodiment of the present invention the message is repeatedly broadcast within an ECM stream.

Additionally in accordance with a preferred embodiment of the present invention the message is repeatedly broadcast with a high priority.

Moreover in accordance with a preferred embodiment of the present invention the method includes including setting the flag to "off" upon arrival of a regular renewal message.

Further in accordance with a preferred embodiment of the present invention at least one of the following occurs at a security element the receiving, the establishing, the granting, and the setting.

Still further in accordance with a preferred embodiment of the present invention the security element grants the grace period entitlement to itself.

Additionally in accordance with a preferred embodiment of the present invention the security element is included in a set top box.

Moreover in accordance with a preferred embodiment of the present invention the security element includes a removable security element.

Further in accordance with a preferred embodiment of the present invention the removable security element includes a smart card.

There is also provided in accordance with another preferred embodiment of the present invention a grace period granting apparatus including a receiver operative to receive a grace period entitlement message, a verifier operative to establish whether a grace period flag indicates that a grace period may be granted, a grace period entitlement granter operative to grant a grace period to an expired entitlement, based, at least in part, on the grace period entitlement message, only if the grace period flag indicates that the grace period has been granted, and a mechanism operative to set the grace period flag to indicate that the grace period has been granted.

BRIEF DESCRIPTION OF THE DRAWINGS

The present invention will be understood and appreciated more fully from the following detailed description, taken in conjunction with the drawings in which:

FIG. 1C is a simplified pictorial illustration of the conditional access system of FIG. 1A, several months after the scene portrayed in FIG. 1B, the conditional access system now storing a grace period entitlement;

FIG. 4 is a partly pictorial, partly block diagram illustration of the security element comprised in the conditional access system of FIG. 1A, with the Entitlements table and a Grace Period table symbolically shown, according to an alternative preferred embodiment of the present invention;

FIG. 5 is a partly pictorial, partly block diagram illustration of the security element of FIG. 4, after the grace period entitlement message has been received; and FIG. 6 is a simplified flowchart illustration of a preferred method of operation of a preferred embodiment of the present invention.

DETAILED DESCRIPTION OF A PREFERRED EMBODIMENT

Reference is now made to FIGS. 1A-1D which, taken together, show a conditional access system over a period of time, in which:

a valid entitlement expires;

the system receives a grace period entitlement message; and the system receives a renewal of the expired entitlement.

Figure 1A:
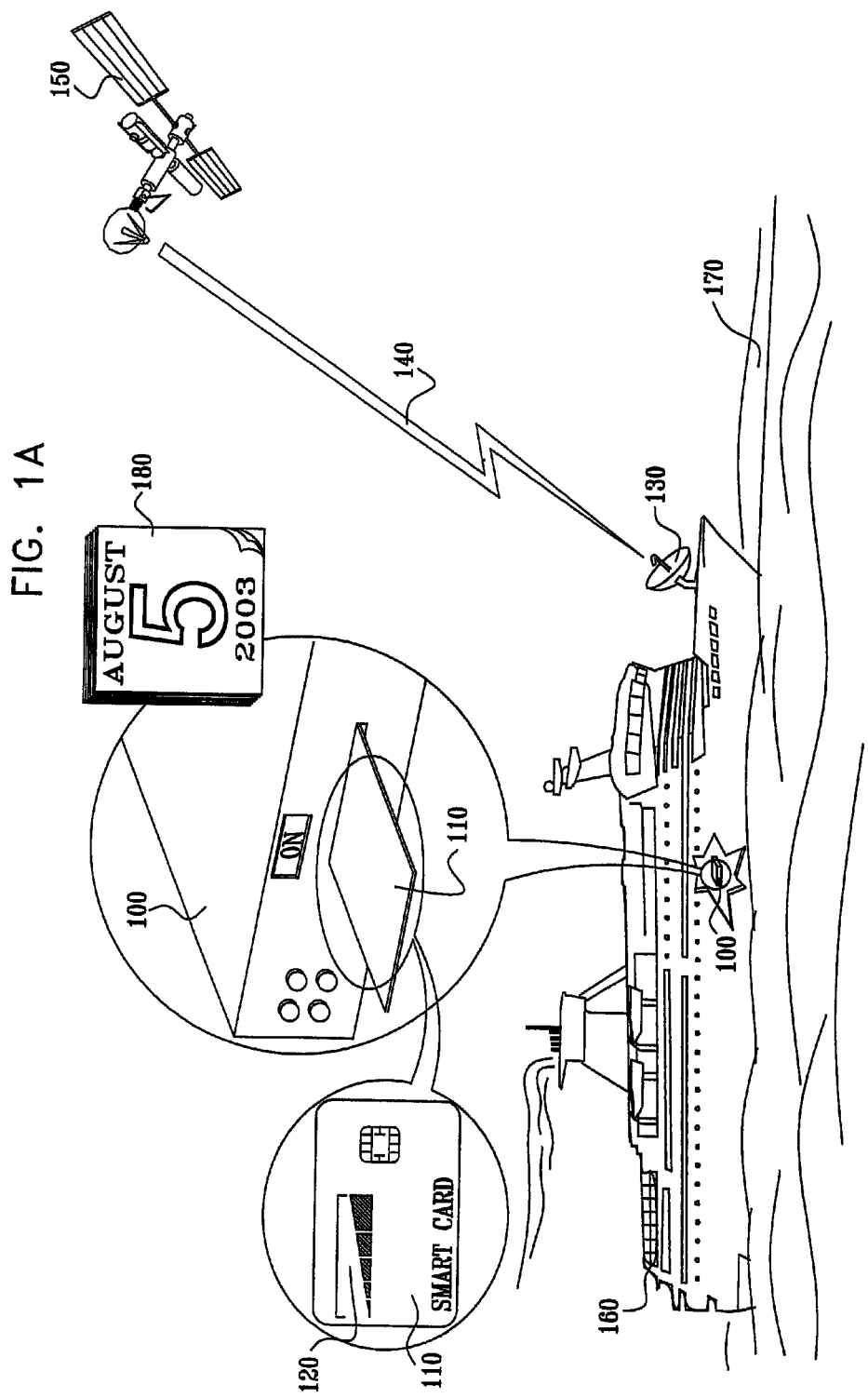
FIG. 1A is a simplified pictorial illustration of a conditional access system storing a valid entitlement, the conditional access system being constructed and operative in accordance with a preferred embodiment of the present invention.

Reference is now specifically made to FIG. 1A, which is a simplified pictorial illustration of the conditional access system storing the valid entitlement, the conditional access system being constructed and operative in accordance with a preferred embodiment of the present invention. The system of FIG. 1A comprises a set top box 100. The set top box 100 typically comprises standard hardware and software components, as are known in the art. The set top box 100 preferably additionally comprises a security element, preferably but not necessarily a removable security element, such as, for example, a smart card 110. A filled-in triangle shape 120 on the smart card 110 symbolically indicates that the smart card 110, at the time depicted, stores the valid entitlement. A data stream 140 broadcast from a satellite 150 preferably comprises entitlement management messages (EMMs), and entitlement control messages (ECMs). The satellite 150 preferably receives the data stream 140 from a broadcast headend (not shown). The ECMs and EMMs preferably comprise at least one entitlement and entitlement renewal message. The data stream 140 is preferably received at an antenna 130 on a yacht 160 from the satellite 150.

FIGS. 1A-1D depict one possible implementation of the present invention, in preferred embodiments thereof. Those skilled in the art will appreciate that the present invention, in preferred embodiments thereof, is operative in a variety of alternative system architectures.

The yacht 160 is at sea 170. A calendar 180 indicates that the scene in FIG. 1A is occurring on 5 Aug. 2003. It is appreciated that the date, 5 Aug. 2003, has been chosen to be a date in the summer in the northern hemisphere, when it is reasonable for the yacht 160 to be at sea, if located in the northern hemisphere. There is no other significance to the date.

Figure 1B:
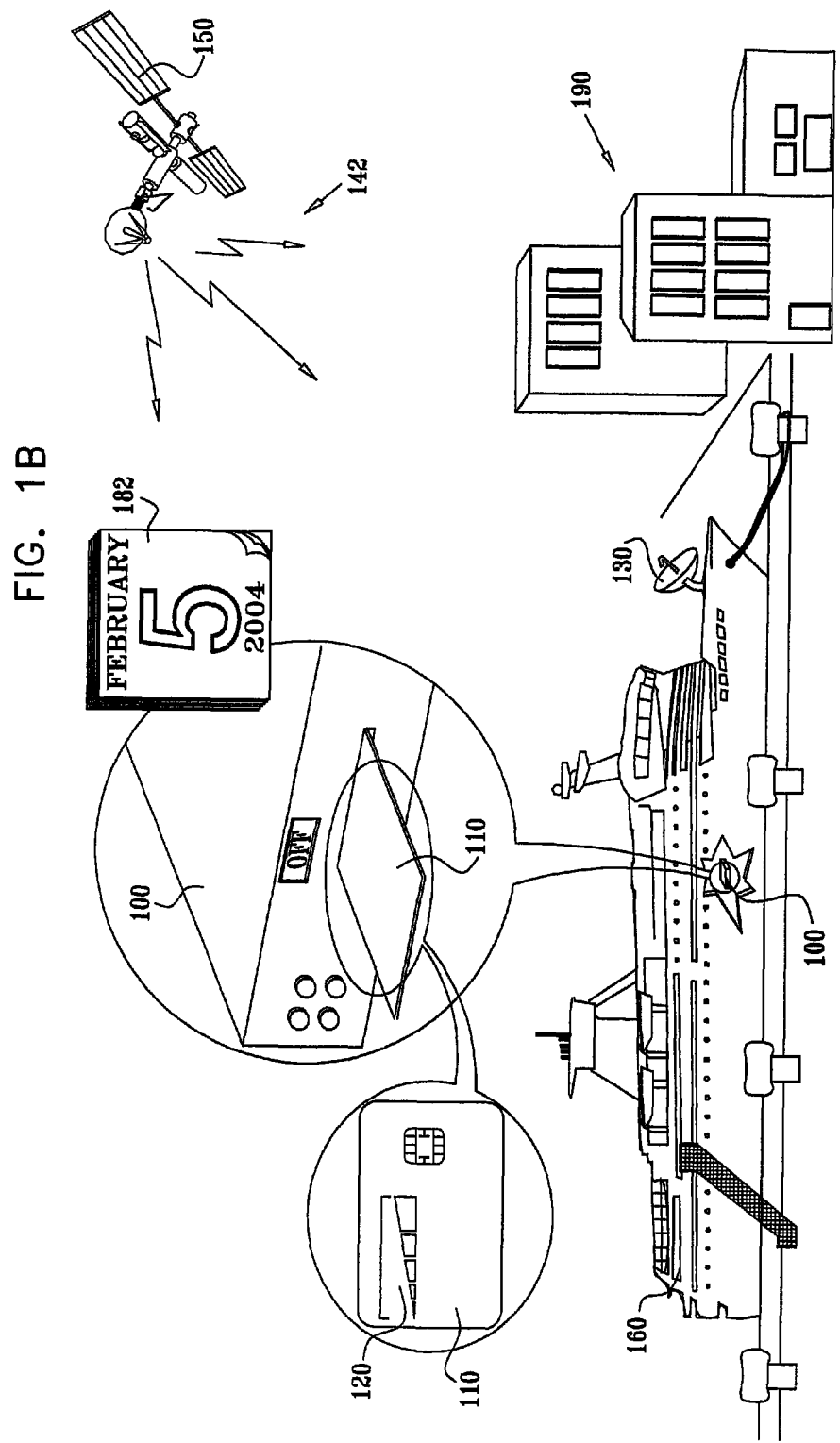
FIG. 1B is a simplified pictorial illustration of the conditional access system of FIG. 1A, several months after the scene portrayed in FIG. 1A, the conditional access system now storing an expired entitlement.
Figure 1D:
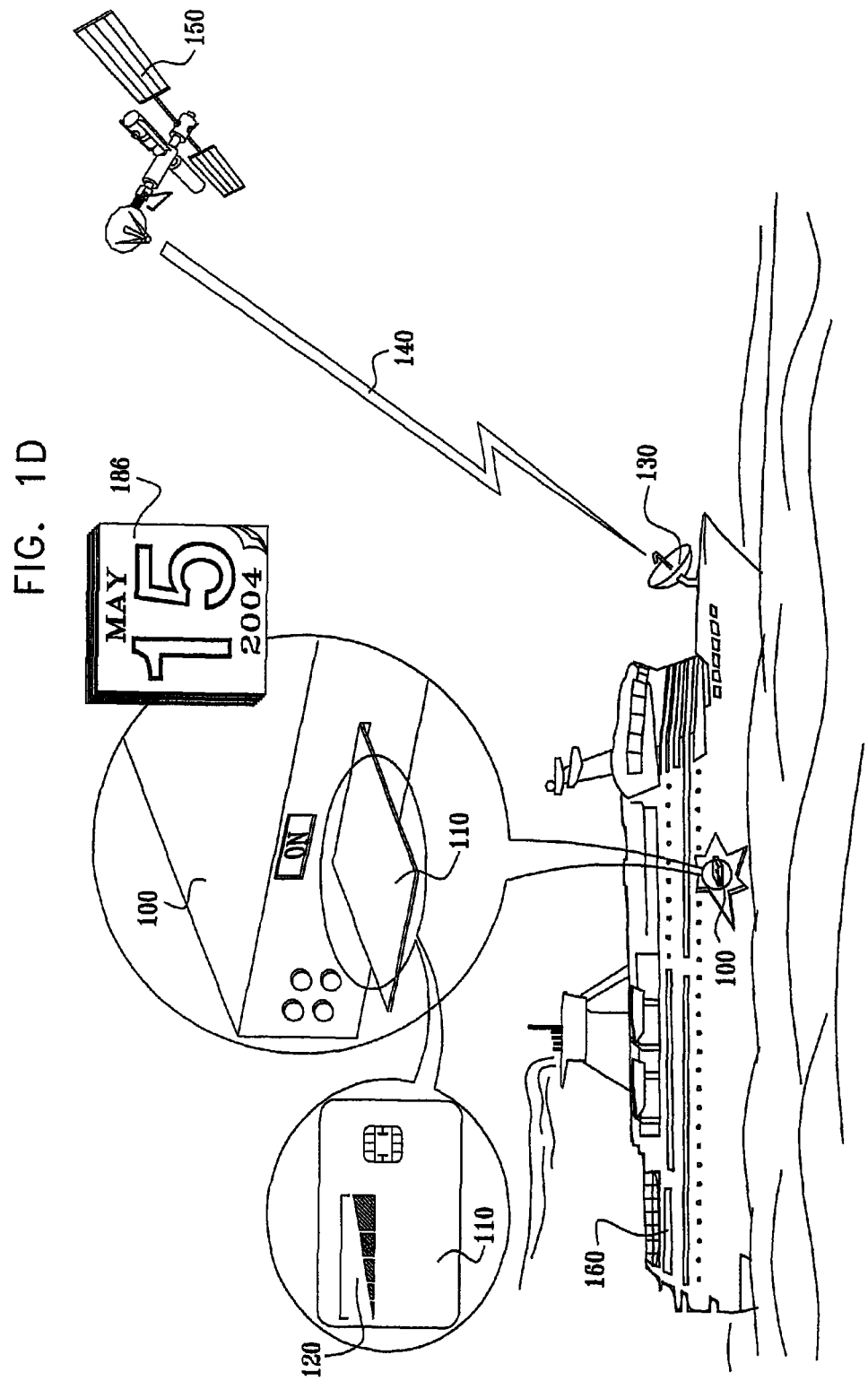
FIG. 1D is a simplified pictorial illustration of the conditional access system of FIG. 1A, several days after the scene portrayed in FIG. 1C, the conditional access system now storing a valid entitlement.

In FIG. 1A, as well as FIGS. 1B-1D, the set top box 100, smart card 110, and other elements in the figure are depicted as located on the yacht 160. It is appreciated that the example of the yacht is purely for illustrative purposes. In practice, the present invention in preferred embodiments thereof is preferably operative with the set top box being disposed in any appropriate location. It is further appreciated that although the broadcast system is depicted as a satellite broadcast system, the present invention is operative with any other appropriate technology, including, but not limited to, cable broadcast, cellular communication, or broadcast over Internet protocol. It is also further appreciated that although all examples are given in the realm of television, other broadcast scenarios are also encompassed within preferred embodiments of the present invention. For example, and without limiting the generality of the foregoing, the present invention, in preferred embodiments thereof, is applicable to satellite radio.

Reference is now made to FIG. 1B, which is a simplified pictorial illustration of the conditional access system of FIG. 1A, several months after the scene portrayed in FIG. 1A, the conditional access system now storing the expired entitlement. In the scene depicted in FIG. 1B, the yacht 160 is docked at a dock 190, and has been for some time. As the calendar 182 indicates, it is now 5 Feb. 2004, and has not been yachting season for some time.

Since the time the yacht has been tied up at the dock, no electric power has been reaching the set top box 100. Thus, although the satellite 150 has preferably been broadcasting the data stream 142 preferably comprising entitlement renewal messages, any entitlement renewal messages which reach the antenna 130 are not received by the set top box 100. Since entitlement renewal messages do not reach the set top box 100, the entitlement renewal messages do not get further relayed to the smart card 110.

At some point after the yacht 160 has been docked at the dock 190, the entitlement stored in the smart card 110 preferably expires. The hollow triangular shape 120 on the smart card 110 symbolically indicates that the smart card 110, at the present time, stores the expired entitlement.

Reference is now made to FIG. 1C, which is a simplified pictorial illustration of the conditional access system of FIG. 1A, several months after the scene portrayed in FIG. 1B, the conditional access system now storing a grace period entitlement. In the scene depicted in FIG. 1C, the yacht 160 is returning to sea 170. The calendar 184 indicates that it is now 5 May 2004, and the new yachting season has begun.

When the set top box 100 is powered up anew, the entitlement stored in the smart card 110 is expired. Since the entitlement in smart card 110 is expired, a subscriber, hoping to view television now will not be able to. The subscriber may have to wait for several hours for an entitlement renewal message to arrive. Alternatively, the subscriber may opt to call a service center and ask for the entitlement renewal message to be sent immediately. Either of these two scenarios is liable to cause the subscriber to feel that he has received poor service from the broadcaster. Furthermore, the broadcaster pays for such calls, and therefore, would like to keep the number of such calls to a minimum.

The satellite 150 preferably broadcasts the data stream 144 comprising at least one grace period entitlement message. A grace period entitlement message is preferably broadcast repeatedly, preferably with a high priority. The grace period entitlement preferably is a temporary entitlement which adds some preferably predetermined amount of time, to a preferably expired regular entitlement. As explained below, a mechanism is preferably in place to ensure that one and only one grace period entitlement may be utilized until the regular entitlement is renewed and expires again.

In some preferred entitlements of the present invention, the satellite 150 preferably broadcasts the at least one grace period entitlement message in the ECM stream.

The grace period entitlement message is preferably received at the antenna 130. The antenna 130 preferably relays the grace period entitlement message to the set top box 100. The set top box 100 preferably processes the grace period entitlement message, and, as explained below with reference to FIGS. 2-5, a combination of hardware and software in the set top box 100 and smart card 110 preferably grant a grace period to the expired entitlement stored in the smart card 110.

The triangular shape 120 on the smart card 1 10 is only partially filled-in, symbolically indicating that the smart card, at the time depicted in FIG. 1C, stores the expired entitlement which has preferably been temporarily extended on the basis of the grace period entitlement message.

Reference is now made to FIG. 1D, which is a simplified pictorial illustration of the conditional access system of FIG. 1A, several days after the scene portrayed in FIG. 1C, the conditional access system now storing the valid entitlement.

The calendar 186 now shows the date as 15 May 2004, indicating the passage of several days since the scene portrayed in FIG. 1C. Sometime, during the days intervening between the scene portrayed in FIG. 1C and the scene portrayed in FIG. 1D, the satellite 150 broadcast comprising the data stream 140 preferably included a regular entitlement renewal message. The entitlement renewal message was preferably received at the antenna 130, and was preferably relayed to the set top box 100. The set top box preferably processed the regular entitlement message, and, a combination of hardware and software in the set top box 100 and smart card 110 preferably granted a regular entitlement to the smart card 100.

The triangular shape 120 on the smart card 110 is now completely filled-in, symbolically indicating that the smart card, at the time depicted in FIG. 1D, stores an entitlement which has preferably been renewed.

Figure 2:
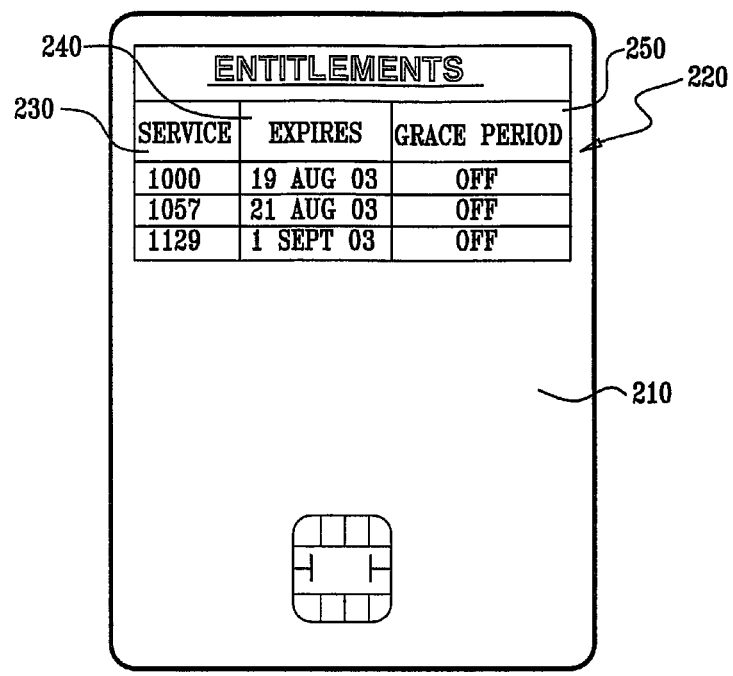
FIG. 2 is a partly pictorial, partly block diagram illustration of a security element comprised in the conditional access system of FIG. 1A, with an Entitlements table symbolically shown, according to one preferred embodiment of the present invention.

Reference is now made to FIG. 2, which is a partly pictorial, partly block diagram illustration of the security element comprised in the conditional access system of FIG. 1A, with an Entitlements table 220 symbolically shown, according to one preferred embodiment of the present invention. The security element of FIG. 2 is illustrated as the smart card 210, as discussed above. The smart card 210 of FIG. 2 preferably comprises the Entitlements table 220 in which entitlements are listed. The Entitlements table preferably comprises three columns. the Service column 230 preferably identifies which services the subscriber is entitled to view. An Expires column 240 preferably identifies a date of expiration for the entitlement. A Grace Period column 250 preferably holds the grace period flag, which indicates if the grace period entitlement message has been used for a given entitlement. It is appreciated that in reality, the Entitlements table and other tables comprising the data shown herein are preferably stored in the smart card 210 in appropriate binary format.

The term "flag", and more specifically "grace period flag", in all of its grammatical forms, is used throughout the present specification and claims to mean an indicator indicating whether the grace period may be granted to the expired entitlement stored in the smart card or not.

Throughout the present disclosure, the term "grace period entitlement" in all of its grammatical forms refers to a type of entitlement that preferably extends an expiration date of an existing entitlement if and only if a predefined condition or set of conditions is met. For example, if the grace period flag is set to off. When the grace period entitlement is received the grace period flag is set to on. When the regular entitlement is subsequently received, the grace period entitlement flag is set, once again, to off.

When the grace period entitlement message is received, at least one of the smart card 210 and the set top box 100 (FIG. 1A) preferably establishes, by referencing the Grace Period column 250, whether or not the grace period flag is "off". If and only if the grace period flag is "off", the grace period is preferably granted to the expired entitlement. When the grace period is granted, the grace period flag is preferably set to "on".

Figure 3:
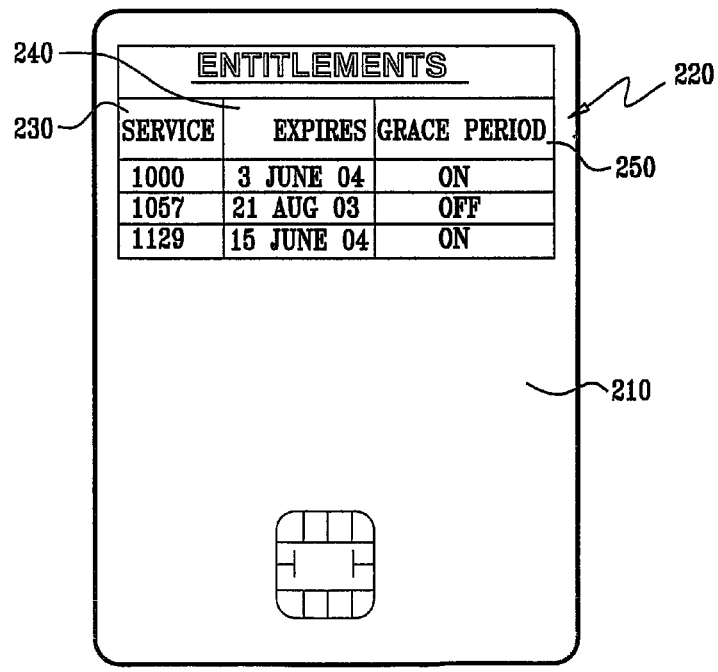
FIG. 3 is a partly pictorial, partly block diagram illustration of the security element of FIG. 2, after a grace period entitlement message has been received.

Reference is now made to FIG. 3, which is a partly pictorial, partly block diagram illustration of the security element of FIG. 2, after the grace period entitlement message has been received. In the preferred embodiment of the present invention illustrated in FIG. 3, grace period entitlement messages are sent preferably on a per-service basis. To illustrate granting of grace periods on a per-service basis, services recorded in two rows in the Entitlements table 220 are depicted as having received grace period entitlement messages. Thus, the row of service 1000 has a corresponding grace period flag set to on. The Expires column 240 corresponding to service 1000 has been advanced, upon receipt of the grace period entitlement message, from 19 Aug. 2003 (FIG. 2) to 3 Jun. 2004. Similarly, the row of service 1129 has its corresponding grace period flag set to on. The Expires column 240 corresponding to service 1129 has been advanced, upon receipt of the grace period entitlement message, from 1 Sep. 2003 (FIG. 2) to 15 Jun. 2004. On the other hand, service 1057 has not yet received the grace period entitlement message. The date in the Expires column 240 remains unchanged from the date in FIG. 2. The value of the grace period entitlement flag for service 1057 remains set to off.

Reference is now made to FIG. 4, which is a partly pictorial, partly block diagram illustration of the security element comprised in the conditional access system of FIG. 1A, with the Entitlements table and a Grace Period table symbolically shown, according to an alternative preferred embodiment of the present invention. The smart card 310 of FIG. 4 preferably comprises the Entitlements table 320 in which entitlements are listed. The Entitlements table preferably comprises two columns. The Service column 330 preferably identifies which service the subscriber is entitled to view. The Expires column 340 preferably identifies the date of expiration for the entitlement. The smart card 310 of FIG. 4 preferably additionally comprises a Grace Period table 350.

When the grace period entitlement message is received, at least one of the smart card 310 and the set top box 100 (FIG. 1A) preferably establishes, by referencing the Grace Period table 350, whether or not the grace period flag is "off". If and only if the grace period renewal flag is "off", the grace period is preferably granted to all expired entitlements. When the grace period is granted, the grace period flag, stored in the Grace Period table 350, is preferably set to "on".

Reference is now made to FIG. 5, which is a partly pictorial, partly block diagram illustration of the security element of FIG. 4, after the grace period entitlement message has been received. Upon receiving the grace period entitlement message, the Entitlements table 320 is preferably updated accordingly. The services listed in the Service column 330 preferably remain unchanged. However, the expiration dates in the Expires column 340 preferably have now been globally extended, as of receipt of the grace period message, to 15 Jun. 2004.

Those skilled in the art will appreciate that the value of the grace period flag stored in the Grace Period table 350 may preferably be represented in the smart card by a single bit.

Alternatively, the grace period flag stored in the Grace Period table 350 may comprise a counter. In one preferred embodiment of the present invention, if the regular entitlement is expired, the counter is preferably incremented each time the grace period entitlement message is received. The entitlement is preferably extended for a predetermined amount of time until the counter is equal to or exceeds a certain threshold. For example, and without limiting the generality of the foregoing, where the threshold is four, a first grace period entitlement extends the validity of the entitlement for six hours. A second and a third grace period entitlement each also extend the validity of the entitlement for six hours. However, the fourth and each subsequent grace period entitlement have no effect on the validity of the entitlement. Once the entitlement has expired, in the absence of the entitlement renewal message, the entitlement will no longer be valid.

Alternatively, the time the regular entitlement is extended for may depend on the value of the counter. For example, and without limiting the generality of the foregoing, where the threshold is four, a first grace period entitlement extends the validity of the entitlement for six hours. A second grace period entitlement extends the validity of the entitlement for three hours. A third grace period entitlement each also extend the validity of the entitlement for one hour. However, the fourth and each subsequent grace period entitlement have no effect on the validity of the entitlement. Once the entitlement has expired, in the absence of the regular entitlement renewal message, the entitlement will no longer be valid.

It is appreciated that in an alternative preferred embodiment of the present invention, instead of receiving grace period entitlement messages broadcast from the broadcast headend, the smart card could preferably grant itself the grace period entitlement.

Reference is now made to FIG. 6 which is a simplified flowchart illustration of a preferred method of operation of a preferred embodiment of the present invention. The method of FIG. 6 is believed to be self-explanatory.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is deemed only by the claims which follow:

What is claimed is:

1. A method for granting a grace period entitlement, the method comprising:
   receiving, at a removable security element, a grace period entitlement message comprising an entitlement to a grace period, the grace period entitlement comprising an entitlement to a service which extends an expiration date of an existing expired entitlement to the service;
   establishing whether a grace period flag indicates that a grace period may be granted;
   granting a grace period to the existing expired entitlement based, at least in part, on the grace period entitlement message, only if the grace period flag is "off";
   predetermining a threshold, such that no further grace periods may be granted to the existing expired entitlement if a grace period counter exceeds the predetermined threshold;
   setting the grace period flag to indicate that the grace period has been granted; and
   incrementing the grace period counter once the existing expired entitlement is extended,
   the flag being "off" when the predetermined threshold is not exceeded, and the flag being "on" when the predetermined threshold is exceeded.

2. The method according to claim 1 and wherein the flag is uniquely associated with the existing expired entitlement.

3. The method according to claim 2 and wherein the flag consists of one bit.

4. The method according to claim 2 and wherein the flag comprises a grace period counter.

5. The method according to claim 1 and wherein the flag is globally associated with a plurality of expired entitlements.

6. The method according to claim 5 and wherein the flag consists of one bit.

7. The method according to claim 5 and wherein the flag comprises a grace period counter.

8. The method according to claim 1 and wherein the grace period entitlement message is sent by a broadcast headend.

9. The method according to claim 1 and wherein the grace period entitlement message is repeatedly broadcast.

10. The method according to claim 9 and wherein the message is repeatedly broadcast within an ECM stream.

11. The method according to claim 10 and wherein the grace period entitlement message is repeatedly broadcast with a high priority.

12. The method according to claim 9 and wherein the message is repeatedly broadcast with a high priority.

13. The method according to claim 1 and also comprising setting the flag to "off" upon arrival of a regular renewal message.

14. The method according to claim 1 and wherein at least one of the following occurs at a security element:
   the receiving;
   the establishing;
   the granting; and
   the setting.

15. The method according to claim 14 and wherein the security element grants the grace period entitlement to itself.

16. The method according to claim 15 and wherein the security element is comprised in a set top box.

17. The method according to claim 14 and wherein the security element comprises a removable security element.

18. The method according to claim 17 and wherein the removable security element comprises a smart card.

19. The method according to claim 1 and wherein the existing expired entitlement is extended for a predetermined amount of time upon receipt of the grace period entitlement message, if the counter does not exceed the threshold.

20. The method according to claim 1 and wherein the existing expired entitlement is extended for a decreasing predetermined amount of time upon receipt of the grace period entitlement message, if the counter does not exceed the threshold, the decrease in the amount of time depending on the value of the counter.

21. The method according to claim 1 and wherein the grace period entitlement message comprises an entitlement which extends an expiration date of an existing expired entitlement.

22. A grace period entitlement granting apparatus comprising:
   a processor; and
   a memory, wherein the memory stores computer executable instructions that when executed by the processor, cause the processor to perform a method comprising:
   receiving a grace period entitlement message comprising an entitlement to a grace period, the grace period entitlement comprising an entitlement to a service which extends an expiration date of an existing expired entitlement to the service;
   establishing whether a grace period flag indicates that a grace period may be granted;
   granting a grace period to the existing expired entitlement, based, at least in part, on the grace period entitlement message, only if the grace period flag indicates that the grace period has been granted;
   determining a threshold in advance of an onset of the grace period, such that no further grace periods may be granted to the existing expired entitlement if a grace period counter exceeds the predetermined threshold;
   setting the grace period flag to indicate that the grace period has been granted; and
   incrementing the grace period counter once the existing expired entitlement is extended,
   wherein the flag is "off" when the threshold is not exceeded, and the flag is "on" when the threshold is exceeded.

23. A grace period entitlement granting apparatus comprising:
- a processor; and
- a memory, wherein the memory stores computer executable instructions that when executed by the processor, cause the processor to perform a method comprising:
- receiving, at a removable security element, a grace period entitlement message comprising an entitlement to a grace period, the grace period entitlement comprising an entitlement to a service which extends an expiration date of an existing expired entitlement to the service;
- establishing whether a grace period flag indicates that a grace period may be granted;
- granting a grace period to the existing expired entitlement based, at least in part, on the grace period entitlement message, only if the grace period flag is "off";
- predetermining a threshold, such that no further grace periods may be granted to the expired entitlement if a grace period counter exceeds the predetermined threshold;
- setting the grace period flag to indicate that the grace period has been granted; and
- incrementing the grace period counter once the existing expired entitlement is extended,
- wherein the flag is "off" when the threshold is not exceeded, and the flag is "on" when the threshold is exceeded.

* * * * *

UNITED STATES PATENT AND TRADEMARK OFFICE
CERTIFICATE OF CORRECTION

| | |
|---|---|
| PATENT NO. | : 8,677,462 B2 |
| APPLICATION NO. | : 11/665791 |
| DATED | : March 18, 2014 |
| INVENTOR(S) | : Waisbard et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1561 days.

Signed and Sealed this
Seventh Day of July, 2015

Michelle K. Lee
*Director of the United States Patent and Trademark Office*

UNITED STATES PATENT AND TRADEMARK OFFICE
CERTIFICATE OF CORRECTION

PATENT NO.       : 8,677,462 B2                                                                 Page 1 of 1
APPLICATION NO.  : 11/665791
DATED            : March 18, 2014
INVENTOR(S)      : Waisbard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1562 days.

Signed and Sealed this
Twenty-ninth Day of September, 2015

Michelle K. Lee
*Director of the United States Patent and Trademark Office*